Patented Feb. 26, 1935

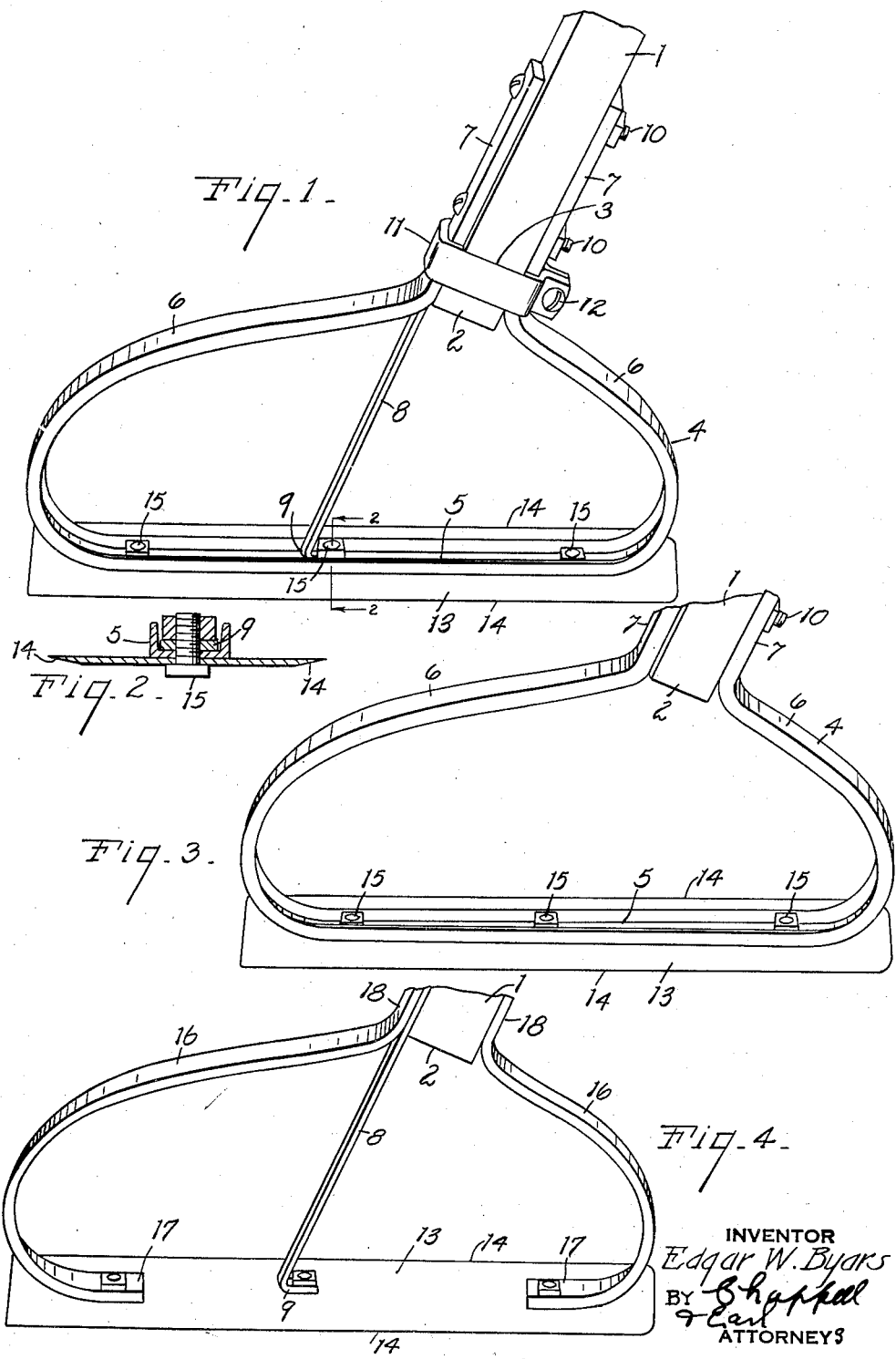

1,992,287

UNITED STATES PATENT OFFICE 1,992,287

WEED AND GRASS CUTTER

Edgar W. Byars, Tampa, Fla.

Application January 20, 1934, Serial No. 707,496

12 Claims. (Cl. 30—9)

The main object of my invention is to provide a weed and grass cutter which is simple and economical in its parts, comparatively light in weight, yet strong and rugged in construction and which is characterized by the absence of vibration in use.

Another object is to provide a device of this character having means for effectively securing the handle and for preventing the splitting of the handle under severe use.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary perspective view of a weed and grass cutter embodying the features of my invention.

Fig. 2 is an enlarged detail section on a line corresponding to line 2—2 of Fig. 1.

Fig. 3 is a fragmentary perspective view of a modification with the brace omitted.

Fig. 4 is a similar view of another modification with the blade backing omitted.

Referring to the drawing, numeral 1 indicates a handle preferably formed of wood and having a substantially rectangular end portion 2 provided with outwardly facing opposed side shoulders 3 spaced a suitable distance from the end thereof. The one piece substantially triangular frame 4 is formed of channel section with the channel facing inwardly and having an elongated bight portion or crosspiece 5 arranged with its longitudinal axis inclined relative to that of the handle, converging arm portions 6, 6 and parallel shank portions 7, 7 overlapping opposed sides of the end portion 2 of the handle.

To increase the rigidity of the cutter and to prevent vibration thereof in use, I provide a central brace 8 in the form of a flat strip of metal having its inner end disposed in the channel of the shank of the longer one of the arm portions 6 and its outer end disposed in the channel of the crosspiece 5, the last named end portion of the brace being bent at 9 to extend parallel with the crosspiece of the frame. The brace is arched slightly to increase its transverse rigidity.

The inner end of the brace 8 and the shank portions of the frame are secured to the rectangular end portion of the handle by means of spaced bolts 10. Between the opposed side shoulders 3 on the handle and the arm portions 6, 6 of the frame 4, I dispose the clamp 11 to embrace the end portion 2 of the handle and the shank portions 7, 7 of the frame, the ends of the clamp being arranged in laterally projecting overlapping relation and held together by the bolt 12. The clamp not only acts to hold the parts in secure assembled relation, but also acts to prevent splitting of the lower end of the handle 1.

A substantially flat cutting blade 13 is disposed on the front of the central portion 5 of the frame, the blade having opposed longitudinal sharpened edges 14, 14. The blade is secured to the crosspiece of the frame by means of spaced bolts 15, 15 the central one of which also secures the outer end of the central brace 8 to the web of such central portion. While the bolts connect the parts so that the device may be readily disassembled for the repair and/or replacement of any part, nevertheless the bolts act to hold the parts in fixed assembled relation, the arrangement of the parts being such that the device is unusually rigid and is characterized by an almost entire lack of vibration in use.

Owing to the open construction of the frame 4, the device is self cleaning and the diagonal arrangement of the cutting blade 13 enables the operator to employ an efficient cutting or chopping stroke, thereby rendering the device particularly effective in the cutting of thick weeds and heavy grass. While I have mentioned grass and weeds, it is to be understood that the device can be used to cut other plants such as vines and can also be employed as a garden cultivator or hoe, although it is particularly designed for heavy work where chopping strokes are required, but for whatever use employed my implement is characterized especially by simplicity, durability, efficiency and absence of vibration.

Referring to Fig. 3, there is illustrated a modification wherein the brace is omitted as well as the clamp. This combination results in a very rigid structure, the central portion 5 of the frame providing in effect a backbone for the blade 13.

In the modification illustrated by Fig. 4, the central portion of the frame is omitted, the side frames 16, 16 terminating in inturned blade supporting portions 17, 17. The brace 8 is connected at its outer end 9 directly to the back of the blade 13. The side portions 16, 16 of the frames are inwardly inclined as illustrated and merge into shank portions 18 and 18, respectively, which overlap the sides of the end of the handle 1. With this arrangement, the central brace acts to strengthen the assembly and prevent vibration of the blade.

In connection with the modification shown in Fig. 4, the frames are of flat strap metal instead of channel section as shown and described in connection with Fig. 1 to 3, inclusive. If desired, the frames of the modification can be formed of channel section.

My cutter can be swung back and forth with one or both hands to cut high grass and weeds, and it does not vibrate or quiver even when used to cut very thick wire grass, such as that common in the south.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A weed and grass cutter comprising in combination, a handle having a rectangular end portion provided with outwardly facing opposed side shoulders, a one piece substantially triangular frame of inwardly facing channel section having a crosspiece arranged with its longitudinal axis inclined relative to that of said handle, converging arm portions, and parallel shank portions overlapping opposed sides of the end portion of said handle, a central brace having its inner end disposed in the channel of one of said shank portions and its outer end disposed in the channel of the crosspiece, the brace being arched slightly to increase its transverse rigidity, bolts connecting said brace and shank portions of the frame to said handle, a clamp embracing said shank portions and handle between said shoulders and said arm portions of the frame, a cutting blade disposed on the front of said crosspiece of the frame, and bolts connecting brace and blade to said crosspiece.

2. A weed and grass cutter comprising in combination, a handle having a rectangular end portion, a one piece substantially triangular frame of inwardly facing channel section having a cross piece, converging arm portions, and parallel shank portions overlapping opposed sides of the end portion of said handle, a central brace having its inner end disposed in the channel of one of said shank portions and its outer end disposed in the channel of the crosspiece, bolts connecting said brace and shank portions of the frame to said handle, a cutting blade disposed on the front of said crosspiece of the frame, and bolts connecting brace and blade to said crosspiece.

3. A weed and grass cutter comprising in combination, a handle having a rectangular end portion provided with outwardly facing opposed side shoulders, a one piece substantially triangular frame having a crosspiece arranged with its longitudinal axis inclined relative to that of said handle, converging arm portions, and parallel shank portions overlapping opposed sides of the end portion of said handle, a central brace having its inner end disposed between said handle and one of said shank portions and its outer end overlapping the crosspiece, means connecting said brace and shank portions of the frame to said handle, a clamp embracing said shank portions and handle between said shoulders and said arm portions of the frame, a cutting blade disposed on the front of said crosspiece of the frame, and means connecting brace and blade to said crosspiece.

4. A weed and grass cutter comprising in combination, a handle having a rectangular end portion, a one piece substantially triangular frame having a crosspiece, converging arm portions, and parallel shank portions overlapping opposed sides of the end portion of said handle, a central brace having its inner end disposed between said handle and one of said shank portions and its outer end overlapping the crosspiece, means connecting said brace and shank portions of the frame to said handle, a cutting blade disposed on the front of said crosspiece of the frame, and means connecting brace and blade to said crosspiece.

5. A weed and grass cutter comprising in combination, a handle, a substantially triangular frame of inwardly facing channel section having a crosspiece arranged with its longitudinal axis inclined relative to that of said handle, converging arm portions, and parallel shank portions overlapping opposed sides of said handle, a central brace having its inner end disposed in the channel of one of said shank portions and its outer end disposed in the channel of the crosspiece, and a cutting blade disposed on the front of said crosspiece of the frame.

6. A weed and grass cutter comprising in combination, a handle, a frame having a crosspiece, converging arm portions, and parallel shank portions overlapping opposed sides of said handle, a central brace having its inner end disposed under one of said shank portions and its outer end disposed back of the crosspiece, and a cutting blade disposed on the front of said crosspiece of the frame.

7. A weed and grass cutter comprising in combination, a handle, a one piece substantially triangular frame having a crosspiece arranged with its longitudinal axis inclined relative to that of said handle, converging arm portions, and parallel shank portions overlapping opposed sides of said handle, means connecting the shank portions of said frame to said handle and a cutting blade on said crosspiece of the frame, said frame having rounded angles and a lateral flange to increase the rigidity thereof.

8. A weed and grass cutter comprising in combination, a handle, a frame having a crosspiece provided with a brace, converging arm portions, and parallel shank portions overlapping opposed sides of the end portions of said handle, and a cutting blade disposed on the front of said crosspiece of the frame with the blade substantially backed up by the brace.

9. A weed and grass cutter comprising in combination, a handle having a rectangular end portion, a pair of side frames each having an inturned blade supporting portion and an inwardly inclined side portion terminating in a shank portion, bolts connecting said shank portions and handle in assembled relation, a cutting blade disposed on the front of said inturned portions, spaced bolts connecting said blade to said inturned blade supporting portions, and a central brace having its inner end disposed between one of said shank portions and the handle and its outer end secured to said blade.

10. A weed and grass cutter comprising in combination, a handle, a pair of side frames each having an inturned blade supporting portion and an inwardly inclined side portion terminating in a shank portion overlapping opposite sides of the end portion of said handle, a cutting blade disposed on the front of said inturned portions, and a central brace of flat stock having its inner end disposed under one of said shank portions and its outer end disposed back of the blade for connecting said blade to the handle.

11. A device of the class described, comprising a handle, a cutting blade, a frame connecting said handle and blade, and a brace of flat stock bisecting said frame in line with said handle and disposed at the back of the blade for increasing the rigidity of the blade and for preventing vibration thereof in use.

12. A weed and grass cutter comprising in combination, a handle having a rectangular end portion, a one piece substantially triangular frame of inwardly facing channel section having a crosspiece, converging arm portions, and parallel shank portions overlapping opposed sides of the end portion of said handle, and a cutting blade disposed on the front of said crosspiece of the frame, said frame having rounded angles coacting with the inwardly facing channel section to increase the rigidity and prevent vibration of the cutter in use.

EDGAR W. BYARS.